INVENTOR.
Michael J. Grebowiec
BY
Thomas E. Scofield
ATTORNEY.

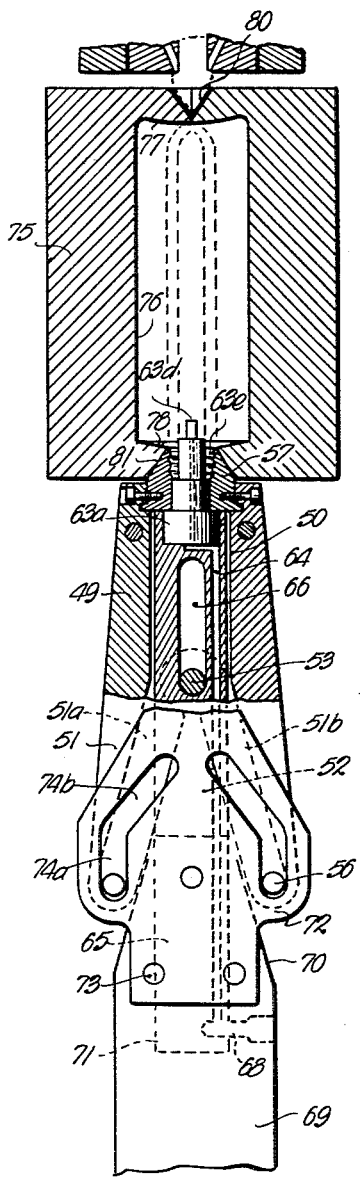

June 14, 1960  M. J. GREBOWIEC  2,940,120
APPARATUS FOR FORMING HOLLOW PLASTIC CONTAINERS
WITH PRE-MOLDED FINISHED NECK SECTIONS
Filed June 1, 1954  4 Sheets-Sheet 3

INVENTOR.
Michael J. Grebowiec
BY
Thomas E. Scofield
ATTORNEY.

2,940,120
Patented June 14, 1960

2,940,120

APPARATUS FOR FORMING HOLLOW PLASTIC CONTAINERS WITH PRE-MOLDED FINISHED NECK SECTIONS

Michael J. Grebowiec, Kansas City, Mo., assignor to Injection Molding Company, Kansas City, Mo., a corporation of Missouri Filed June 1, 1954, Ser. No. 433,606

3 Claims. (Cl. 18—5)

This invention relates to methods and apparatus for blow molding plastic containers and refers more particularly to such methods and apparatus for forming hollow plastic containers or bottles with pre-molded finished neck sections.

Previously, plastic bottles and containers have been produced by a process of extruding a tube of plastic between the halves of a mold from an extrusion head assembly, closing the mold sections on the tube to fix both ends therein while leaving the tube suspended within the cavity of the mold, and then injecting air into the tube to expand it against the walls of the mold to form a container or bottle of the desired shape.

One of the main objections to this process in its present form is that while the neck portion of the container may be blown formed to the proper outlines as is the rest of the container, it comes out of the mold essentially unfinished and with a large amount of excess plastic thereon. Therefore, special operations are required to trim off the excess material (commonly called pre-cutting), core out the neck section to the proper internal diameter and face the section to its proper height. It is obvious that these extra operations require additional time, handling of containers, and the excess material which is trimmed from the original molded neck section is waste and must be reprocessed. Extra machinery and employees to man them as well as factory space for the placement of the machines are also, of course, required. The extra operations demanded by the unfinished neck sections, while simple, and of a very prosaic and mechanical nature, require handling of the containers individually by employees and insertion of the containers into finishing and facing machines, thus offering the usual statistical hazards to the employee and possible costs to the employer.

Therefore an object of the present invention is to provide a method of forming plastic containers having pre-molded finishing neck sections.

Another object is to provide a method of forming plastic containers having pre-molded finished neck sections wherein no finishing operations on the neck portion are required, thereby minimizing expenditures of time, material and handling by the employees together with eliminating the need for extra finishing machines and operators to man them.

Another object is to provide a method of forming plastic bottles wherein plastic is extruded from an extruding head assembly directly into a thread die assembly thereby first forming the neck of the container in its final form.

Another object of the invention is to provide a method of forming plastic bottles wherein plastic material is extruded directly into a thread die assembly, the thread die assembly then leading a hollow tube of plastic from the extruding assembly between the halves of a mold, the mold halves then being closed on the tube, the bottle or container blown within the mold and the container then released both from the mold and from the thread die assembly.

Another object of the present invention is to provide apparatus for forming plastic bottles having pre-molded finished neck sections comprising an extruding head assembly to extrude plastic in the form of a hollow tube, a thread die assembly movable toward and away from the extrusion head assembly to receive plastic from the extruding head assembly and draw the hollow tube therefrom, and mold sections adjacent the extruding head assembly movable to enclose the hollow tube when the thread die assembly is retracted from the extruding head assembly.

Still another object is to provide apparatus having the above mentioned parts and an air input in the thread die assembly operable to inject air into the hollow tube when the tube is enclosed by the mold sections.

Still another object is to provide such described apparatus for producing plastic containers with pre-formed neck sections wherein the thread die assembly is removable from the formed neck of the container and the mold sections retractable from the body of the container after the container has been formed or blown in the mold.

Other and further objects of the invention will appear in the course of the following description.

In the accompanying drawings which form a part of the instant specifications and are to be read in conjunction therewith, embodiments of the inventive apparatus and method are shown and like numerals are used to indicate like parts in the various views.

Fig. 2 is a side view of the apparatus of Fig. 1 showing a later stage in the operation of the inventive method.

Fig. 3 is a side view similar to that of Fig. 2 but illustrating a still later stage than that shown in Fig. 2 of the inventive method.

Figure 1:
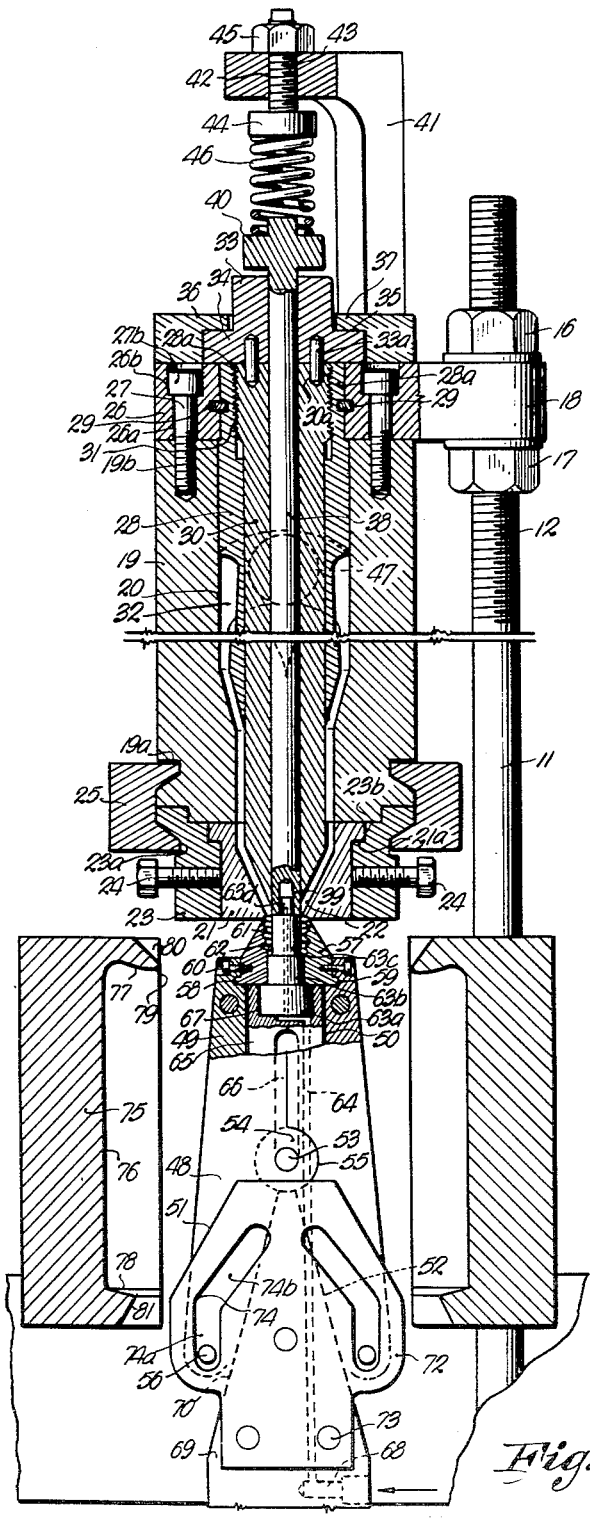
Fig. 1 is a side-sectional view of the upper portion of an apparatus for forming blow-molded plastic containers with pre-molded finished neck sections. This view is also intended to illustrate the first stage of the inventive method.
Figure 6:
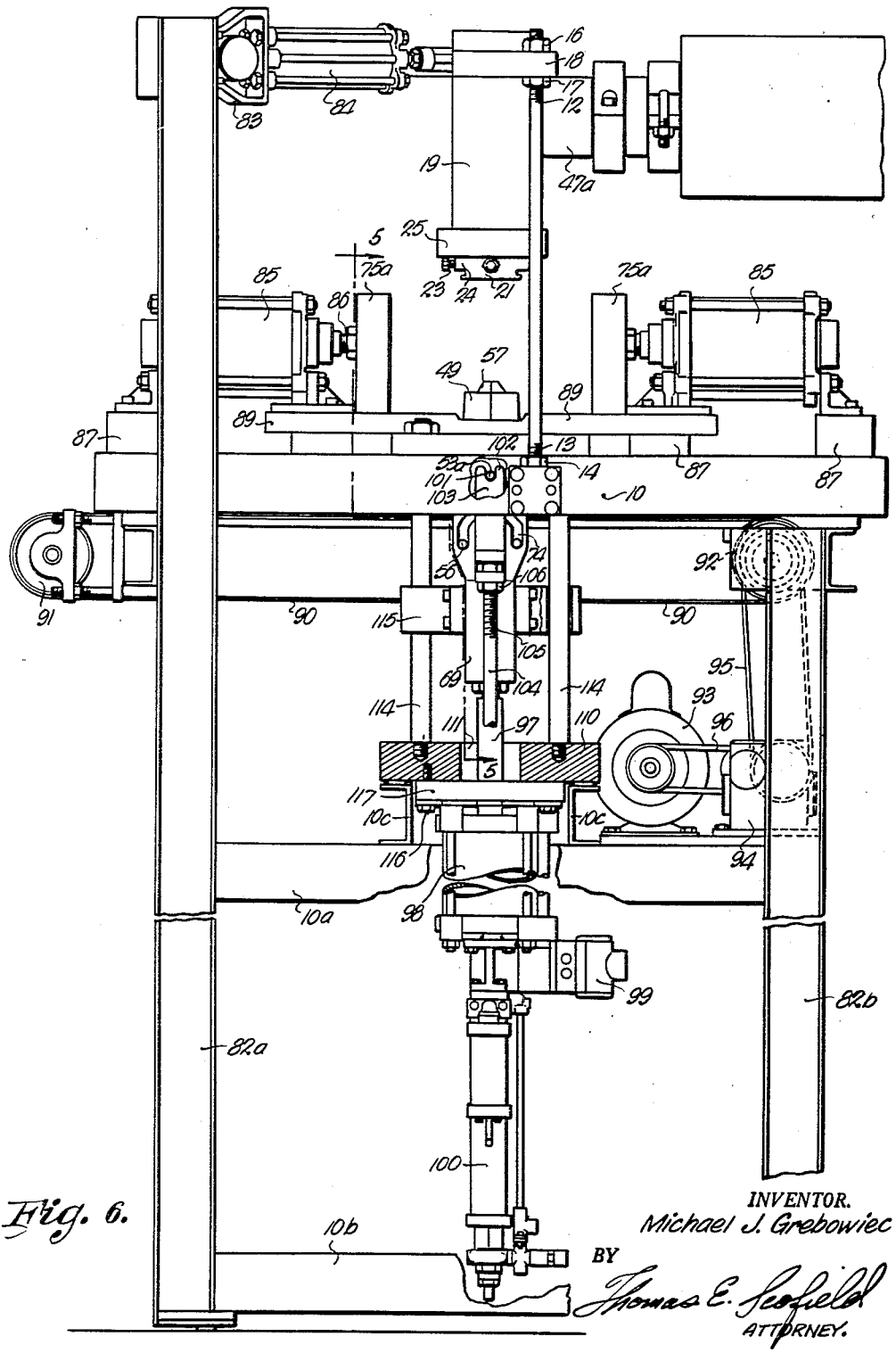
Fig. 6 is a side view with parts in section of assembled apparatus for blow molding plastic containers with pre-molded finished neck sections.

Referring to the drawings and more particularly to Figs. 1 and 6, the apparatus comprising the present invention and in which the inventive method is practiced has three basic part assemblies. These assemblies will be described separately and comprise; an extrusion head assembly designed to extrude a tube of hot semi-fluid plastic material, a thread die-core assembly adapted to receive plastic material from the extrusion head assembly and to move toward and away therefrom, and a mold assembly positioned adjacent the extrusion end of the extrusion head assembly, halves of the mold adapted to move relative the extrusion head assembly. The four figures, as well as showing the parts and details of the apparatus, illustrate various stages of the method in operation.

It should be noted that the three basic part assemblies, the extrusion head assembly, the thread die-core assembly, and the mold assembly, are mounted and movable relative each other by essentially conventional mounting and moving apparatus and means which are well known in the art. Fig. 6 shows these part assemblies as mounted on a preferred form of frame. These mounting and moving means and mechanisms are not shown in full detail, nor will they be described in complete detail, save insofar as their function is concerned with the inventive method. It is understood that a variety of mounting and moving frameworks and mechanisms could be employed to achieve the effects which will be described, and it is not intended that the present invention be restricted to any particular such assembly.

The particular mounting arrangement illustrated in Fig. 6 will be described after the structure of the basic part assemblies is set forth but it should be understood that such mounting is not to be viewed in a limiting sense.

The extrusion head assembly

The extrusion head assembly will be first described, and this assembly is best seen in the upper portion of Figure 1. The extrusion head assembly is mounted on die carrier frame 10, which is shown schematically in Figure 6, and is suspended thereabove by support rods 11, which have upper and lower threaded sections 12 and 13 engaged by frame lock nut 14 and extrusion head lock nuts 16 and 17. Fixed between extrusion head lock nuts 16 and 17 is extrusion head assembly support 18, which is fixedly attached to the extrusion head assembly and rigidly supports same.

The extrusion head assembly has a head body 19 containing head body cavity 20. Bushing 21 is positioned adjacent the lower end of head body 19 and has circular orifice 22 therein. Bushing holder 23 circumferentially encloses bushing 21 and has adjusting screws 24 piercing its sides and abutting bushing 21. There are four adjusting screws 24 positioned 90 degrees of arc apart, so that the bushing may be adjusted precisely relative the head body 19. Bushing holder clamp ring 25 engages indented portions 19a and 23a of head body 19 and bushing holder 23 to fixedly attach the bushing and bushing holder to head body 19. Shoulder 21a on bushing 21 engages indented portion 23b of bushing holder 23 to maintain vertical engagement of the bushing and bushing holder. Spreader cap bracket 26 is positioned above head body 19 and is fixedly attached thereto by spreader cap bracket screws 27 which engage thread holes 19b in head body 19 and pass through holes 26a of the spreader cap bracket which have enlarged shouldered portions 26b to engage screw heads 27b. Stationary spreader 28 is mounted inside of head body 19 and spreader cap bracket 26 is fixedly attached to the latter by keys 29. Secondary spreader 30 is mounted within stationary spreader 28 and movably attached thereto by threads 31 which engage threaded portion 28a of the stationary spreader. Annulus 32 is defined in cavity 20 between the inner wall of head body 19 and spreaders 28 and 30. Portions of the secondary spreader 30 are supported next to the inner wall of the head body down to the first angular break point in the inner body wall. Adjusting nut 33, having lower flange 34, is mounted above the secondary spreader 30, the stationary spreader 28 and the spreader cap bracket 26. Nut 33 is connected with secondary spreader by lugs 35 which are press fitted into holes 33a of the adjusting nut and slidably fitted into holes 30a of the secondary spreader 30. Rotation of adjusting nut 33 thereby rotates secondary spreader 30 within stationary spreader 28, thereby moving the secondary spreader up or down relative the head body 19. Adjusting nut retainer 36 is fixedly attached to spreader cap bracket 26 by screws and dowels which are not shown. Adjusting nut retainer 36 has flange 37 which retains, with suitable rotatory clearance, flange 34 of adjusting nut 33. Mandrel 38 is slidably mounted within adjusting nut 33 and secondary spreader 30. Mandrel 38 has cylindrical opening 39 in the lower tip thereof and spring retainer 40 formed at the upper end thereof. Mandrel retention arm 41 is fixedly mounted on adjusting nut retainer 36 and has threaded hole 42 therein to receive upper spring retention shaft 43, which is also threaded therein. Upper spring retainer 44 is fixedly attached to the lower portion of shaft 43 and adjusting lock nut 45 is adjustably attached to the upper portion thereof. Mandrel pressure spring 46 is engaged between spring retainers 40 and 44 and is compressible by movement of mandrel 38 upward. The tension of spring 46 is, of course, adjustable by rotation of upper spring retention shaft 43.

Plastic inlet opening 47 penetrates head body 19 as shown. Plastic material is introduced into head 19, or, more accurately, annulus 32 through inlet 47 from a flow channel (47a—Fig. 5) which is controlled by means of a directional valve, neither of which latter structures are illustrated, being conventional and well known in the art. What should merely be noted for the purposes of this description is that the quantity of and rate of flow of molten plastic material into the head are both readily controllable. The path of flow of the molten plastic material from inlet 47 is defined by the stationary spreader 30. The plastic material enters the cavity 20 or annulus 32 through the inlet and flows around the channels defined by the head body 19 inner wall and stationary spreader 30 outer wall for 90 degrees on each side of the spreader 30, when the channels turn sharply 90 degrees downwardly and then widen until the two channels meet at a point opposite the first break in the head body inner wall. As previously mentioned, the secondary spreader is supported next to the body wall down to the aforementioned point.

The thread die-core assembly

The thread die-core assembly is formed from two basic sub-assemblies, the die holder sub-assembly, comprising a pair of inter-connected die holders containing two circumferential die members, and the die-core sub-assembly, composed of a die-core, a core holder, a wedge block, and cams mounted on said wedge block. These sub-assemblies will be separately described and the die holder sub-assembly first.

Referring first to the die holder sub-assembly, die holders 48 have circumferential upper arms 49 (parallel when the die holders 48 are in closed position as in Figs. 1, 2 and 3) defining cavity 50 therebetween. Die holder lower arms 51 are angled apart when the die holder is in the previously mentioned closed position, and, when in that position, define larger cavity 52 therebetween. Lower arms 51 have paired side faces 51a and outer walls 51b which define cavity 52 therebetween (see Fig. 2). Die holders 48 are pivotally attached at the junctures of arms 49 and 51 by pivot pin 53, which is fixedly attached to rounded bearing portions 54 and has extensions 53a (see Fig. 5). Bearing portions 54 are each formed on an opposite die holder 48, the opposing die holder having hollowed bearing space 55 to fit over and mate with the opposing bearing portion 54. Pairs of rollers 56 are rotatably mounted on the outer surfaces of side faces 51a. Circumferential die members 57 having flange 58 on the bases thereof to fit into recesses 59 in die holder upper arms 49 are fixedly mounted in the upper arms 49 by screws 60. The inner side molding faces 61 of die members 57 are configured to form the outline of the neck section of the container which is to be blow molded. The cavity 62 between the two faces 61 is of the outer diameter of such a neck section.

Referring to the die-core sub-assembly, core 63 has base 63a, extension 63b, neck section 63c and nipple 63d as constituent parts. Air injection passage 64 penetrates all of the sections of core 63 set forth hereinbefore. It should be noted that the diameter of neck section 63c is equal to the desired internal diameter of the neck section of the container which is to be formed. Neck section 63c and side faces 61 of circumferential die members 57 define between them an annulus having the precise form and structure of the neck section of the container. Core holder 65 has slot 66 therein to contain pivot pin 53. The length of slot 66 is equivalent to the distance between operation points A—A and C—C, the significance of which distance will be explained later in connection with the operation of the apparatus and inventive method. Core holder 65 also has opening 67 to contain base 63a of core 63. Air injection passageway 64 is continued from core 63 and runs the length of core holder 65 wherefrom it departs through side opening 68. Wedge block 69 has angled upper edges 70 which mate with outer walls 51b of die holders 48 when the latter are in closed position. Block 69 has cavity 71 (Fig. 2) therein to receive in fixed engagement core holder 65. Core 63, core holders 65 and wedge block 69 are fixedly attached one to the other and move as a unit, never separating from one another. Air passage 64 continues in wedge block 69 mating with the passageway in the core 63 and core holder 65. Die holder opening cams 72 are fastened to the side faces of wedge block 69 by screws 73 and have slots 74 cut therein. Slots 74 have parallel portions 74a of a length equivalent to the distance of operation point A—A to B—B. Slots 74 additionally have angled-in portions 74b having a length vertically equivalent to the distance from operating point B—B to C—C. These operating points, as previously mentioned, will be explained in more detail in the description of the operation.

*The mold assembly*

The operating portion of the mold assembly is composed of mold halves 75 having inner walls 76, upper walls 77 and lower walls 78. Upper walls 77 contain tube gripping portions 79 having a very small clearance so as to fuse the bottom portions of the molten tube when the mold halves close but not to sever the tube inside the mold from that outside the mold. Upper walls 77 also have wells 80 therein to contain the upward extension of the molten tube. Lower walls 78 have angled faces 81 so configured as to sealedly engage the outer faces of circumferential die members 57 when the mold halves are closed. When the mold halves 75 are closed against the circumferential die members 57, the continuation of the inner face of lower wall 78 from the inner side molding face 61 of the circumferential die member 57 defines the neck and shoulder section outer shape of the container to be formed.

*Operation*

The operation of the method and the interaction of the various portions of the apparatus will be described in relation to Figures 1 through 4.

Referring first to Figure 1, the apparatus is shown in starting position. Note that the thread die-core assembly is positioned adjacent the extrusion head assembly and, more particularly, the orifice 22 of the extrusion head bushing 21. The outside surfaces of the circumferential die members 57 are juxtaposed against the angled surfaces of the bushing orifice and the thread die-core 63 is positioned against the mandrel 38 and is forcing it into retracted position against the action of the spring 46. The nipple 63d on the thread die-core is engaged by the cylindrical hollow orifice 39 in the mandrel to center the die-core thereon. Thus the annulus between the secondary spreader 30 and the extrusion head bushing 21 and the annulus 63e between the thread die-core and thread die circumferential members are aligned, one with the other.

Plastic material is introduced into the head body 19 of the extrusion die assembly by means of a directional valve, which is not shown. The plastic material is forced downwardly around the two spreaders 28 and 30 and through the circular orifice 22 formed by the bushing 21 and the core-mandrel union into the thread die annulus 63e. The mold sections 75, during this portion of the operation, are separated and out of contact with either the extrusion head assembly or the thread die assembly. The annulus 63e between the thread die core 63 and the circumferential die members 57 is packed with plastic from the extrusion head assembly until a predetermined pressure has been attained, at which time the thread die-core assembly is moved downwardly away from the extrusion head assembly. As the extrusion of plastic material from the bushing orifice continues during the motion of the thread die-core assembly away from the extrusion head assembly, the result is that a hollow tube of plastic is led downwardly from the extrusion head assembly by the thread die assembly. Preferably, the thread die assembly is moved downwardly at a rate equal to the rate of extrusion of plastic material from the extrusion head assembly, thus providing an extruded molten tube of uniform wall thickness. The thread die assembly leads the hollow tube from the bushing down to position A—A (Fig. 2) preparatory to blowing. This distance is essentially equivalent to the length of the molds 75 plus the desired clearance distance between the top of the mold and the bottom of the extrusion head assembly.

When position A—A has been reached, the mold sections 75 are closed, as is shown in Fig. 2. The top portions of the mold tightly squeeze the walls of the tube together to form a seal therebetween as well as to grip the end of the tube. The lower ends of the molds enclose in sealing fashion the outer surface of the thread die circumferential members 57. The lower end of the tube, of course, remains enclosed in the annulus 63e between the die-core 63 and the circumferential members 57. When the mold sections 75 have closed to sealing position, air is injected through passage 64 in the die-core assembly to blow the bottle and distend the walls of the tube against the inner walls 76 of the mold.

It should be noted that at the beginning of the motion downward of the thread die assembly, that the mandrel 38 in the extrusion head assembly moves downwardly with the core 63 until it is flush with the face of the bushing 21. It is desirable to maintain the mandrel 38 in this position until the next contact of the die-core 63 in order to facilitate cutoff of the plastic material from the extrusion head assembly after the bottle is formed and blown. The die holder sub-assembly of the retracting thread die-core assembly, together with the attached circumferential die members 57, is stopped from any further downward movement at position A—A and moves no further downwardly during the rest of the container forming cycle.

Referring now to Figure 3, after the bottle or container is formed within the molds 75 by blowing, the core 63, which is secured in the core holder 65, which in turn is anchored in the wedge block 69, moves downwardly out of the blown bottle, or, more accurately, the neck of the blown bottle, to position B—B. Position B—B is defined as the point at which the rollers 56 reach the position in the slots 74 in the cam where the slots or cam ways 74 turn inwardly off parallel and the die core is out of the container neck section. During the motion from position A—A to position B—B, the rollers 56 are riding in the camways 74, but, as during this time the camways or slots 74 are parallel, no force is applied through the rollers 56 to the die holders 48 and attached circumferential die members 57 to move them apart. Thus, during the motion from position A—A to position B—B, the circumferential die members 57 continue to fixedly grasp the outer portion of the formed neck section of the container, despite the fact that the die-core 63 is being withdrawn therefrom.

When the die core assembly reaches position B—B, the mold sections 75 are drawn apart, thus leaving the formed container suspended by the tail of plastic material from the extrusion head assembly and, momentarily, still fixed by the neck in the circumferential die members 57. Although the mold sections are moved apart at positions B—B, there is no hesitation of the downward movement of the die-core assembly at position B—B, and the die-core assembly continues to move downwardly to position C—C. Position C—C is defined as the point where the rollers 56 on the die holder assembly reach the end of camways or slots 74 and the dieholder arms 49 are completely separated with lower arms 51 essentially parallel coreholder 65. Between positions B—B and C—C, the rollers 56 on the die holders 48 riding in the camways 74 are forced off parallel by the angular projection 74b inwardly of the camways 74 and cause the circumferential die members 57 to open, leaving the container suspended and held only by the unused portion of the tube protruding from the bushing orifice 22.

At this juncture, a synchronized cutter blade shears off the unused portion of the tube flush with the bushing 21 and mandrel 38 faces and ejects it inwardly between the mold sections 75 to carry off conveyor. Neither the cutter blade nor the carry off conveyor are shown (in Figs. 1 through 4), as such apparatus is well known and conventional in the art.

After the container is ejected, the die-core assembly is moved upwardly between the die holders 48, thereby reversing the previously described cam action, reuniting the circumferential die members 57 and reassembling the thread die assembly into an integral unit. The die holder sub-assembly of the thread die assembly is held at position A—A until the die core subassembly reaches position A—A also, at which time the entire assembly continues upward to contact the bushing 21 and mandrel 38 and repeat the previously described cycle. There is no hesitation of upward movement by the die-core subassembly at position B—B or the thread die assembly at position A—A.

*Assembly mountings*

Referring finally to the mounting of the various assemblies for operation, Figure 6 illustrates a preferred form of mounting for the inventive apparatus on a suitable frame. The frame has essentially four horizontal levels defined by the die carrier members 10, the air cylinder support members 10a, bottom braces 10b and lower plate support members 10c. The horizontal levels are joined by vertical support 82a, b, et cetera.

Referring to the mounting of the extrusion head assembly, as previously noted, extrusion head 19 is supported by rod 11 which is mounted on die carrier member 10. To the right of extrusion head 19 is shown the plastic input apparatus having flow line 47a. This apparatus is conventional, and will not be described in detail. To the left of extrusion head 19, mounted on vertical support 82a by bracket 83 is conventional air cylinder 84 which operates the valve in flow line 47a.

Figures 4, 5:
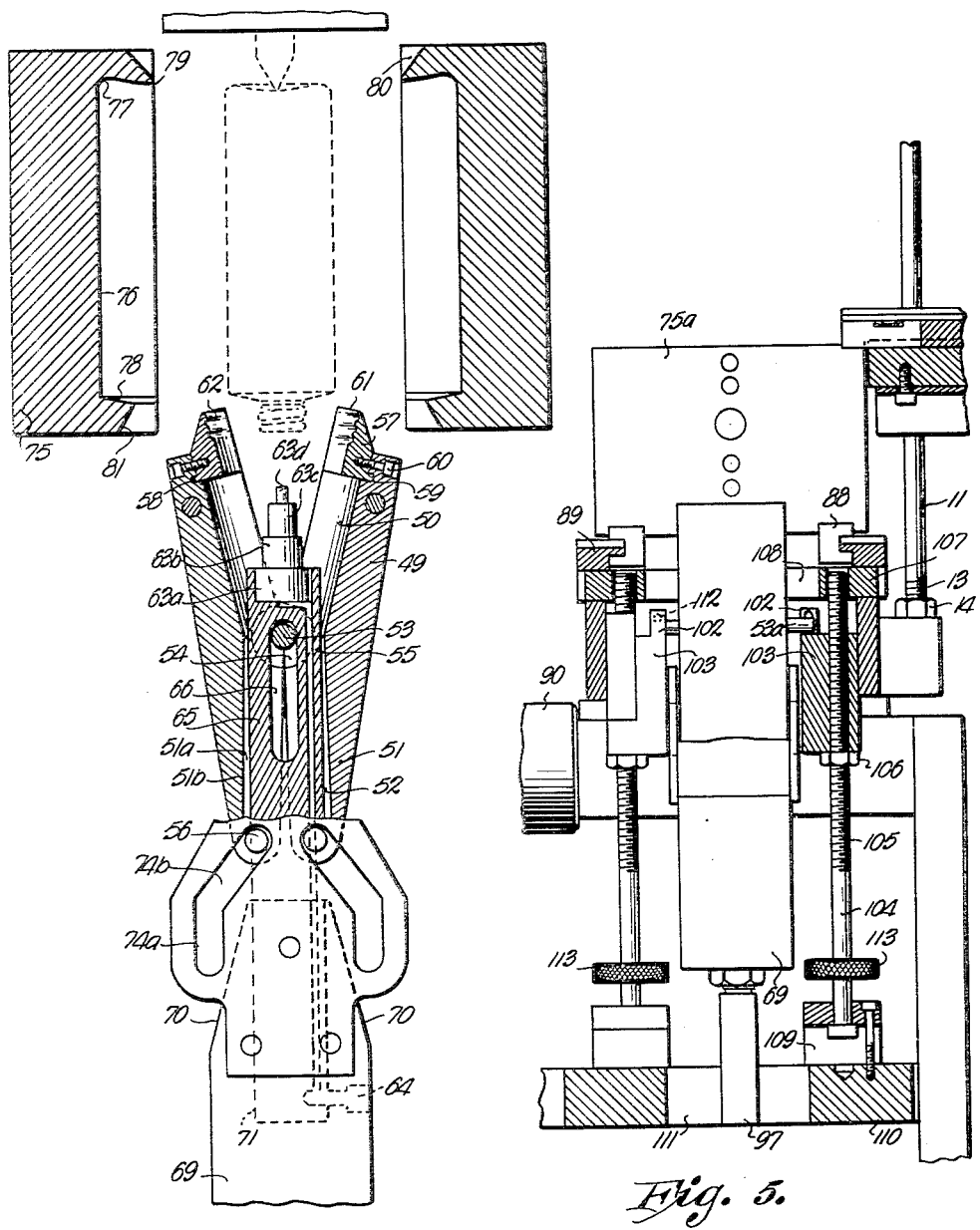
Fig. 4 is a side view of the apparatus of Fig. 1 but illustrating a stage in the inventive method still later than that of Fig. 3.
Fig. 5 is a view taken along lines 5—5 of Fig. 6 in the direction of arrows.

The mold assembly is also mounted on die carrier members 10. Conventional air cylinders 85 having shafts 86 carry platens 75a, (the die molds are not shown in Fig. 6) mounted on bases 87. As is best seen in Fig. 5, platens 75-A have guides 88 which ride on tracks 89.

A preferred form of conveyer belt system for the removal of blown containers is shown mounted below die carrier members 10, having main belt 90 and pulleys 91 and 92 which are driven by electric motor 93 (mounted on air cylinder support member 10a) through gear reducer 94 by drive belts 95 and 96.

Referring to the mounting of the thread die-core assembly it should be noted that wedge block 69 is fixed to the shaft 97 at one end thereof, the other end of shaft 97 being fixed to a piston (not shown) riding in conventional air cylinder 98. Air cylinder 98 has air input 99. Hydrocheck cylinder 100 (also conventional) serves to smooth and buffer the motion of the shaft 97.

In the downward motion of the thread die-core assembly away from the extrusion head assembly leading the molten tube of plastic material, the entire thread die-core assembly halts at level A—A while molds 75 close and the container is blown. Both Figures 5 and 6 illustrate the thread die-core assembly at position A—A.

Two forces act to stop the thread die-core assembly at position A—A: (1) the piston in the air cylinder 98 is stopped, which stops the die core sub-assembly, and (2) pivot pin extension 53a is captured in slot 101 between arms 102 of stop block 103. Stop block 103 (best seen in Fig. 5) is adjustably mounted on pin stop rod 104, having threaded portion 105 by lock nut 106. Pin stop rod 104 is rotatably journalled at its upper end in upper plate 107, having upper hole 108 therein to permit motion of the die core sub-assembly therethrough. Rod 104 is also rotatably journalled at its lower end in mounting block 109 fixedly attached to lower plate 110 having lower hole 111 therein to permit motion of die-core subassembly therethrough. Lower plate 110 is mounted on horizontal plate support member 10c. Spring loaded plunger 112 is mounted in arms 102 to delay disengagement of pivot pin extension 53a. Knurled adjustment screws 113 cooperating with lock nut 106 adjust the relative height of stop block 103.

Referring now to Fig. 6, wedge block guide rods 114 are also mounted with lower ends fixed in lower plate 110 and are fixedly attached at their upper end to upper plate 107. Wedge block guides 115 are slidably mounted on rods 114 and guide the die-core sub-assembly in its motion downward from the point A—A to points B—B and C—C. The stopping of the die core sub-assembly at point C—C is accomplished and determined by stopping the piston in air cylinder 98. Cylinder 98 is attached to lower plate 110 by bolts 116 through plate 117. When the die core sub-assembly is returning from point C—C to point A—A after the container is blown and removed from the mold, it picks up the die holder sub-assembly and moves up toward bushing 21. Spring loaded plunger 112 offers sufficient resistance to allow seating of wedge block 69 in the die holder lower arms 48b.

From the foregoing it will be seen that this invention is one well adapted to attain all of the ends and objects hereinabove set forth, together with other advantages which are obvious and which are inherent to the structure and method.

It will be understood that certain features and sub-combinations are of utility and not to be employed without reference to other features and sub-combinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In apparatus for forming hollow containers with premolded, finished neck sections including an extrusion head assembly comprising a body having a cavity therein, a plastic inlet opening into said cavity, a plastic extrusion opening out of said cavity, and a mandrel positioned within said cavity and extending at least closely adjacent the extrusion opening, the improvement which comprises a thread die core assembly movable to and from said extrusion head assembly to receive plastic material therefrom and draw a tube of plastic therefrom, said thread die core assembly having a thread die subassembly and a die core subassembly, the thread die subassembly comprising a longitudinal pair of die members including mating molding faces at one end thereof, the pair of die members pivoted at a point along their length and having outwardly angled legs at the end opposite the mating molding faces, whereby to engage the mating molding faces when the angled legs are apart and separate the mating molding faces when the angled legs are together, the die core subassembly including a die core insertable between said mating molding faces to define therewith a container neck-forming plastic receiving annulus and removable therefrom; and means cooperating with the thread die subassembly to force engagement of the mating molding faces when the die core is inserted therebetween and to force disengagement of the mating molding faces when the die core is removed therebetween.

2. Apparatus as in claim 1 wherein said means cooperating with the thread die subassembly to force engagement and disengagement of the mating molding faces comprises rollers mounted on said outwardly angled arms, said rollers engaged by camways fixed relative said die core and having angled tracks.

3. Apparatus as in claim 2 including a wedge block fixedly attached to the lower portion of said die core, said wedge block figured so as to engage the inner surfaces of said outwardly angled legs when said die core is positioned relative said mating molding faces to define said container neck-forming annulus, whereby to lock said mating molding faces relative said die core.

References Cited in the file of this patent

UNITED STATES PATENTS

| | | |
|---|---|---|
| 611,631 | Hoffman | Oct. 4, 1898 |
| 646,849 | Lindemeyr | Apr. 3, 1900 |
| 1,502,561 | Glaspey | July 22, 1924 |
| 2,118,793 | Howard | May 24, 1938 |
| 2,288,454 | Hobson | June 30, 1942 |
| 2,358,857 | Gits | Sept. 26, 1944 |
| 2,554,011 | Clark et al. | May 22, 1951 |
| 2,562,523 | Brunet | July 31, 1951 |
| 2,579,390 | Mills | Dec. 18, 1951 |
| 2,619,774 | Rowe | Dec. 2, 1952 |
| 2,632,202 | Haines | Mar. 24, 1953 |
| 2,710,987 | Sherman | June 21, 1955 |

FOREIGN PATENTS

| | | |
|---|---|---|
| 163,661 | Australia | Dec. 18, 1952 |